(12) United States Patent
Bains et al.

(10) Patent No.: US 7,860,125 B2
(45) Date of Patent: Dec. 28, 2010

(54) FLEXIBLE TIME STAMPING

(75) Inventors: Amrik Bains, Livermore, CA (US);
Daniel C. Biederman, San Jose, CA (US); Darrell Rice Heflin, Cedar Park, TX (US); Norman William Finn, Livermore, CA (US); Krishna Kondaka, Fremont, CA (US); Peter Geoffrey Jones, Campbell, CA (US)

(73) Assignee: Cisco Techology, Inc., San Jose, CA (US)

( * ) Notice: Subject to any disclaimer, the term of this patent is extended or adjusted under 35 U.S.C. 154(b) by 317 days.

(21) Appl. No.: 12/020,836

(22) Filed: Jan. 28, 2008

(65) Prior Publication Data
US 2009/0190589 A1 Jul. 30, 2009

(51) Int. Cl.
*H04J 3/16* (2006.01)
(52) U.S. Cl. ..................................... 370/469
(58) Field of Classification Search ............... 370/469
See application file for complete search history.

(56) References Cited

U.S. PATENT DOCUMENTS

| | | | |
|---|---|---|---|
| 6,470,031 | B1 | 10/2002 | Loy et al. |
| 6,947,997 | B2 | 9/2005 | Tang et al. |
| 6,980,582 | B2 | 12/2005 | Cai |
| 7,508,845 | B2 * | 3/2009 | Baker ..................... 370/516 |
| 2002/0021717 | A1 | 2/2002 | Hedayat et al. |
| 2004/0062200 | A1 * | 4/2004 | Kesavan ..................... 370/235 |
| 2005/0111448 | A1 * | 5/2005 | Narad ........................ 370/389 |
| 2005/0152330 | A1 * | 7/2005 | Stephens et al. ............ 370/350 |
| 2005/0157651 | A1 | 7/2005 | Ao et al. |
| 2005/0163054 | A1 | 7/2005 | Cui |
| 2005/0177643 | A1 * | 8/2005 | Xu ............................. 709/231 |
| 2005/0207387 | A1 * | 9/2005 | Middleton et al. ........... 370/347 |
| 2006/0013215 | A1 | 1/2006 | Kong et al. |
| 2006/0062161 | A1 | 3/2006 | Tang et al. |
| 2007/0230495 | A1 | 10/2007 | Li |
| 2008/0129880 | A1 * | 6/2008 | Shao et al. .................. 348/723 |
| 2008/0273521 | A1 * | 11/2008 | Shao et al. .................. 370/350 |

OTHER PUBLICATIONS

U.S. Appl. No. 11/494,104, Biederman et al.
U.S. Appl. No. 11/493,981, Biederman et al.
Written Opinion and International Search report for Application No. PCT/US2009/032073 dated Aug. 18, 2009.

* cited by examiner

*Primary Examiner*—Derrick W Ferris
*Assistant Examiner*—Mang Yeung
(74) *Attorney, Agent, or Firm*—Tucker Ellis & West LLP

(57) ABSTRACT

In an example embodiment, an apparatus comprising a physical layer processing device that comprises logic configured to process a packet received from a physical layer interface is disclosed. The physical layer processing device logic is further configured to determine a preamble portion of the packet and a data portion of the packet. The physical layer processing device logic is further configured to insert a timestamp into the preamble portion of the packet. The physical layer processing device logic forwards the packet with the timestamp inserted into the preamble.

15 Claims, 6 Drawing Sheets

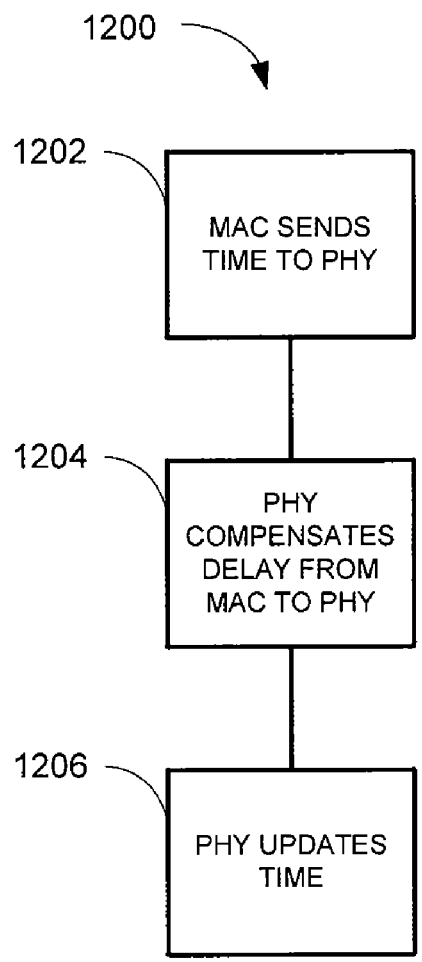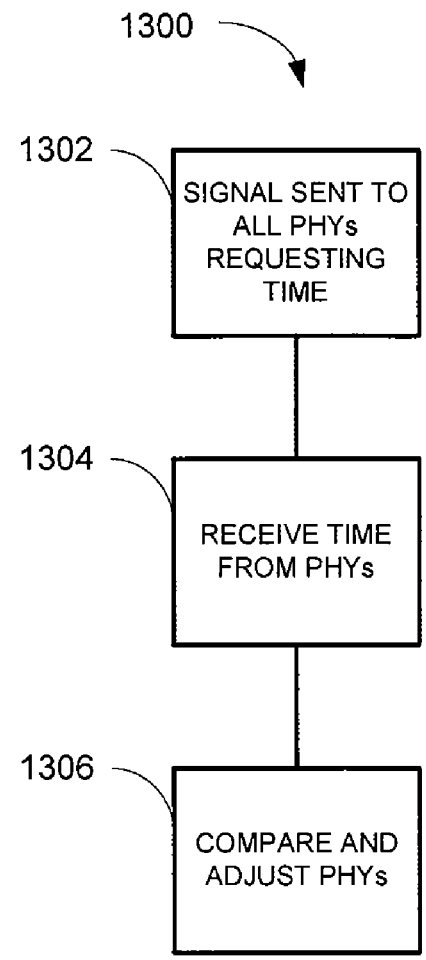
FIG. 10
FIG. 11

FLEXIBLE TIME STAMPING

TECHNICAL FIELD

The present disclosure relates generally to determining when data packets are sent and/or received.

BACKGROUND

The accurate recording of a time a packet is sent or received is desirable for many applications. Timestamps can be used by network administrators for network diagnostics. For wireless networks, accurate time stamping can be useful for acquiring accurate location data for wireless nodes. Time stamping is also frequently employed in financial transaction and is used in industrial applications such as automation and control systems and power generation, transmission and distribution.

The most accurate place to time a packet is at the Physical Layer (PHY) interface or at the Media Access Control (MAC)/PHY interface where no flexible parsing occurs (for example the PHY or MAC cannot determine whether the timestamp can be discarded). The MAC is can be somewhat accurate if there are no PHY delays, but like the PHY no flexible parsing occurs. A forwarding controller (FC) or Central Processing Unit (CPU) coupled to the MAC can allow for flexible parsing, but is usually not accurate enough because of delays and jitter between the PHY, MAC and FC. Further complicating the problem is that devices such as switches frequently employ multiple PHY interfaces which should be synchronized.

BRIEF DESCRIPTION OF THE DRAWINGS

The accompanying drawings incorporated herein and forming a part of the specification illustrate the examples embodiments.

FIG. 10 illustrates an example of a method for updating a physical layer processor clock module via a packet.

FIG. 11 illustrates an example of a method for synchronizing multiple physical layer processor clock modules.

OVERVIEW OF EXAMPLE EMBODIMENTS

Figure 1:
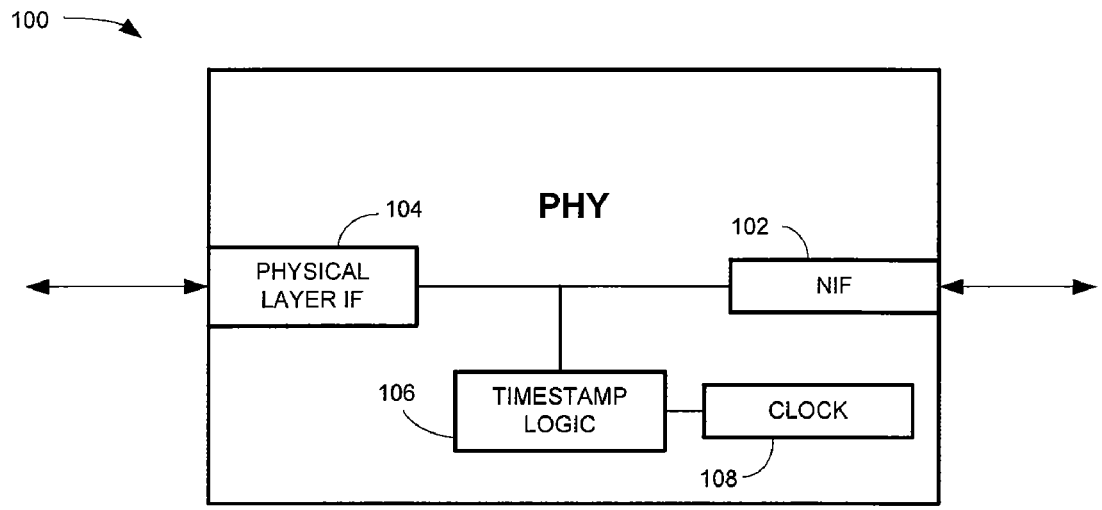
FIG. 1 is a physical layer processing device in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a physical layer processing device that comprises logic configured to process a packet received from a physical layer interface is disclosed. The physical layer processing device logic is configured to determine a preamble portion of the packet and a data portion of the packet. The physical layer processing device logic is further configured to insert a timestamp into the preamble portion of the packet. The physical layer processing device logic forwards the packet with the timestamp inserted into the preamble.

In accordance with an example embodiment, there is disclosed herein a method comprising receiving a packet at a physical layer interface, that has a preamble. A timestamp is inserted into the preamble of the packet at the physical layer interface. The packet is forwarded with the inserted timestamp to a media access control interface. The packet and the timestamp are forwarded from the media access control interface to a processor.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described in connection with the embodiment is included in at least one embodiment described herein. The appearances of the phrase "in one embodiment" or "in one or more embodiments" in various places in the specification are not necessarily all referring to the same embodiment, nor are separate or alternative embodiments mutually exclusive of other embodiments. Features and aspects of various embodiments may be integrated into other embodiments, and embodiments illustrated in this document may be implemented without all of the features or aspects illustrated or described.

Referring to FIG. 1 there illustrated a Physical Layer (PHY) processing device 100 such as a local area network interface (e.g. Ethernet), modem or digital signal processor. PHY 100 typically performs digital signal processing, such as analog-to-digital and digital-to-analog conversion, and encoding/decoding of waveforms (modulation/demodulation). The digital signal processing can be done with general purpose digital signal processing integrated circuits, or in specially designed digital logic. In either case, PHY 100 is modulating/demodulating data to be compatible with the appropriate communication standard. For example for wireless devices, the Institute of Electrical and Electronic Engineers (IEEE) 802.11a standard uses Orthogonal Frequency Domain Modulation (OFDM), while the IEEE 802.11b standard employs Direct Sequence Spread Spectrum (DSSS). Data is sent and/or received on the physical layer via a physical layer interface (IF) 104. On one side of PHY 100, data is exchanged with a Network IF, such as a Media Access Control (MAC) processor via Network Interface (NIF) 102. PHY 100 may suitably comprise analog-to-digital (A/D) converters for data received from Physical Layer IF 104, and digital-to-analog (D/A) converters for data transmitted to Physical Layer IF 104.

In accordance with an example embodiment, PHY 100 comprises a clock module 108 comprising logic for maintaining time. "Logic," as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Timestamp logic 106 located between Physical Layer IF 104 and NIF 102 (the interface between the PHY 100 and a Network Layer processing device or a MAC processing device), as will be described in more detail herein, is configured to timestamp packets that are sent and/or received on Physical Layer IF 104.

Figure 5:
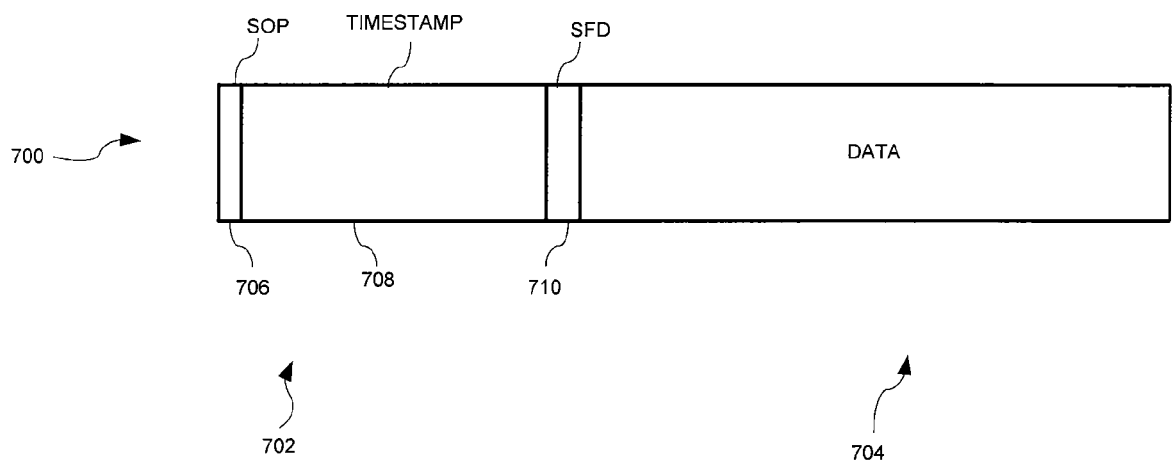
FIG. 5 illustrates a packet processed in accordance with an example embodiment.

In operation, as a packet is being received on Physical Layer IF 104, timestamp logic 106 is responsive to determine a preamble portion of the packet and a data portion of the packet. FIG. 5 illustrates an example of a packet 700 comprising a preamble portion 702 and a data portion 704. The preamble portion 702 comprises a start of packet (SOP) bit or bits 706 and a start frame delimiter (SFD) 710, which indicates the beginning of the data portion 704. The portion of the packet indicated by 708 corresponds to bits for one or more fields for use by the physical layer processor such as Operations Administration and Maintenance (OAM) bits, application specific bits and header Cyclic Redundancy Check (CRC) bits.

After the physical layer processing device 100 has processed the preamble portion 702 of packet 700, timestamp logic 106 acquires the current time from clock 108 and inserts a timestamp into the preamble portion 702 of the packet 700. For example, the timestamp may be inserted at bits 708 in preamble 702. The timestamp corresponds to the current time acquired from clock 108. Additional information may also be inserted at bits 706, such as a signature associated with the timestamp and/or other timestamp data, such as resolution. The packet 700 with the timestamp inserted into the preamble 702 is then forwarded on NIF 102 to a network interface processor, such as a media access control (MAC) processor.

In an example embodiment, additional data is inserted into the preamble to provide further information about the timestamp. For example, a predefined bit may be set to inform the network interface processor data about the format and/or resolution of the timestamp.

In an example embodiment, as packets are received via NIF 102, timestamp logic 106 determines from inspecting the packet whether a timestamp corresponding to the time the packet was transmitted via the Physical Layer IF 104 is requested. For example, timestamp logic 106 may ascertain whether a time-bit and/or signature are indicated within bits 708 of the preamble portion 702 of a packet 700. As another example, data may be pre-appended or appended onto the data portion 704 of a packet 700 to enable timestamp logic 106 to determine whether a process (or processor) desires to receive a timestamp indicating when the packet 700 was sent through Physical Layer IF 104. In particular embodiments, a frame identification (frame ID) field may be included with the packet.

If timestamp logic 106 determines a timestamp is requested for a packet, such as a packet similar to packet 700, timestamp logic 106 stores the time when the packet is sent via Physical Layer Interface 104. The time is acquired from clock 108. The timestamp may held in storage accessible to an external device, such as a CPU, to allow the external device to acquire the timestamp. In an example embodiment, the timestamp is stored in a first-in-first-out (FIFO) buffer for retrieval by the processor requesting the timestamp.

In an example embodiment, processing logic (not shown) within physical layer interface device 100 is in communication with the processor requesting the timestamp. This allows a signal to be sent from physical layer processing device 100 to the processor requesting the timestamp.

In example embodiments, a frame ID associated with the packet is stored with the timestamp. The frame ID can assist a processor in locating the correct timestamp.

In an example embodiment, timestamp logic 106 synchronizes clock 108 based on received external signals. For example, as packets arrive through NIF 102, the timestamp on the packet from the network interface processor is acquired, and the timestamp is adjusted for the delay between the network interface processor and timestamp logic 106. Clock 108 is updated based on the adjusted timestamp from the packet received on NIF 102. As another example, an external device, such as a CPU (not shown), may send a signal requesting the current time of clock 108. Timestamp logic 106 acquires the current time from clock 108 and stores it in a predetermined data storage, such as a register or FIFO, or timestamp logic 106 sends a signal to the requesting device with data representative of the current time acquired from clock 108. Timestamp logic 106 may receive a signal from the external device indicating that clock 108 should be adjusted. The signal may comprise data indicating an amount of time to increment or decrement clock 108 or data indicating a new setting for clock 108.

Figure 2:
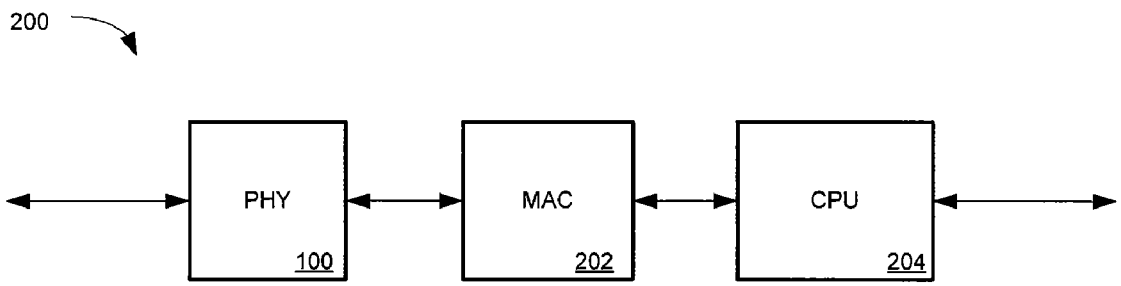
FIG. 2 illustrates an example of a device with a single physical layer interface and a single processor.

FIG. 2 illustrates an example of a device 200 with a single CPU 204 and a single PHY 100. PHY 100 is configured in accordance with at least one example embodiment described in FIG. 1. PHY 100 is coupled to MAC processor 202. MAC 202 can act upon the data, for example, by encrypting or decrypting it, or by interpreting the data and making decisions as to how and when to forward it. CPU 204 may provide for application layer or other processing of data.

Incoming packets from the physical media are received by PHY 100. PHY 100 associates a timestamp into the packet. For example a timestamp can be inserted into the preamble of the packet. As another example, a timestamp can be pre-appended or appended onto the packet.

Media access control (MAC) processing device 202 is in communication with PHY 100. MAC 202 receives the packet with the timestamp from PHY 100. MAC 202 comprises logic for processing the packet and timestamp received from PHY 100. MAC 202 is configured to forward the packet and the timestamp to CPU 204.

CPU 204 then parses the packet as received from MAC 202. Upon parsing the packet, CPU 204 can determine whether the timestamp received with the packet should be retained or discarded. In an example embodiment, MAC 202 forwards the timestamp in preamble of the packet (which may or may not be the same preamble that PHY 100 inserted the timestamp into) and CPU 204 acquires the timestamp from the preamble of the packet.

In an example embodiment, CPU 204 sets a predefined time-bit on an outgoing packet for transmission by PHY 100 if CPU 204 wants to know when the packet was actually sent.

The packet is forwarded from CPU 204 to MAC 202. MAC 202 performs any desired network processing, for example a MAC address header may be added and/or MAC layer encryption may be performed, and the packet is forwarded to PHY 100 with the time-bit set. PHY 100 is responsive to receiving the packet with the time-bit to store the time that the packet is transmitted from PHY 100. The timestamp may be stored in any suitable data storage device, such as a register or FIFO that enables CPU 204 to acquire the timestamp for the packet. In an example embodiment, PHY 100 suitably comprises logic to send the timestamp to CPU 204.

In an example embodiment, CPU 204 may further include a signature with the time-bit. In particular embodiments, CPU 204 includes a frame ID with the packet. The signature and/or frame ID are forwarded from CPU 204 to MAC 202 and from MAC 202 to PHY 100. PHY 100 removes the frame ID and/or signature from the packet before transmission. In an example embodiment, MAC 202 and CPU 204 are implemented by a single device, e.g. a single CPU that performs both functions.

Figure 3:
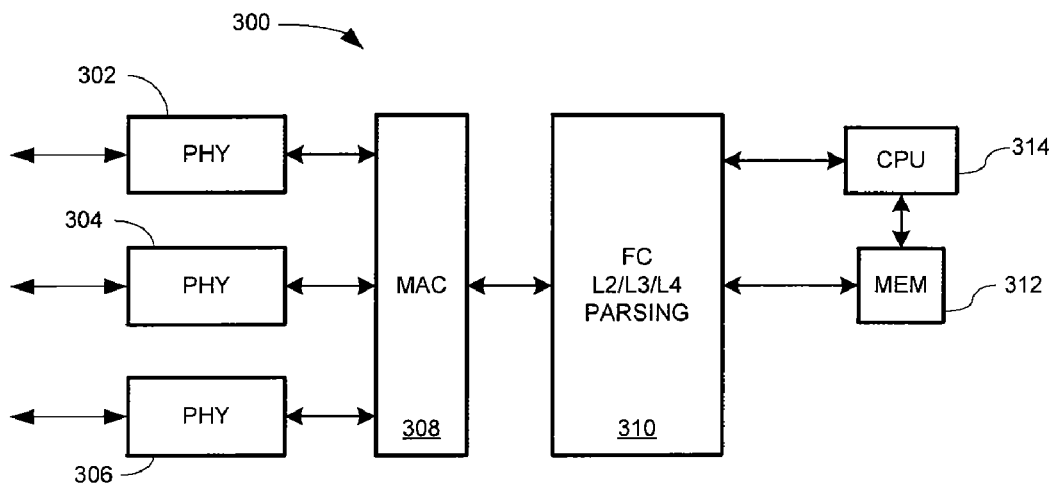
FIG. 3 illustrates an example of a device with multiple physical layer processing circuits.

FIG. 3 illustrates an example of a device 300 with multiple physical layer processing circuits 302, 304, 306. Device 300 illustrates a configuration suitable for implementing a switch. Although the example embodiment illustrated in FIG. 3 employs three physical layer processing circuits 302, 304, 306, this should not be construed as limiting the principles described herein to devices with three physical layer processing circuits as the principles described herein can be adapted to devices having any physically realizable number of physical layer processing devices. Similarly, the principles described herein are suitable for devices having any physically realizable number of stack/CPU interfaces.

Physical layer processing devices 302, 304, 306 may be configured in accordance with any of the example embodiments described herein, such as for example were described for PHY 100 in FIG. 1. PHY processing devices 302, 304, 306 are coupled to a MAC processing device 308 ("MAC 308"). MAC 308 is coupled to a forwarding controller (FC) 310. FC 310 is configured to perform layer 2, layer 3 and/or layer 4 (or any higher layer such as layers 5, 6 and/or 7) processing of packets to and from MAC 308. In an example embodiment, memory (MEM) 312 is employed to transfer packets between CPU 314 and FC 310. MEM 312 may also be employed to transfer packets between FC 310 and other processors (not shown) in addition to CPU 314. In an example embodiment, FC 310 may directly communicate with CPU 314.

When a packet is received on one of PHYs 302, 304, 306, the PHY receiving the packet inserts a timestamp into the packet. In an example embodiment, the timestamp is inserted into a predefined portion of the packet, such as the preamble. The packet is then forwarded by the PHY receiving the packet to MAC 308. MAC 308 is configured to receive the packet and the timestamp to forward the packet and timestamp to FC 310. FC 310 parses the packet and determines whether the timestamp should be retained or discarded. If the timestamp is to be retained, FC 310 forwards the packet and timestamp to MEM and/or CPU 314 so CPU 314 can acquire the packet and timestamp; otherwise, FC 310 discards the timestamp and forwards the packet normally.

When CPU 314 desires a timestamp for a packet to be transmitted by one of PHYs 302, 304, 306, CPU 314 sets a time-bit on the packet. Optionally, CPU 314 may include a signature, such as a frame identifier (Frame ID) to facilitate matching timestamps with packets. The packet with the time-bit set is forwarded to MEM 312. MEM 312 forwards the packet and the time-bit to FC 310. FC 310 processes the packet and forwards the packet and an indication that the time-bit was set to MAC 308. The indication may be the time-bit itself or other data may be employed to indicate to MAC 308 that a timestamp for the packet is desired. MAC 308 processes the packet and forwards the packet with data indicating whether the time-bit was set to one of PHYs 302, 304, 306. In an example embodiment, MAC 308 sets a specified bit in the preamble of the packet before forwarding the packet to one of PHYs 302, 304, 306 for processing to indicate whether a timestamp is desired. The PHY transmitting the packet (for example PHY 302) receives the packet with data indicating whether the time-bit was set from MAC 308. The PHY removes the data indicating whether the time-bit was set before transmitting the packet and then transmits the packet. If the time-bit was set, the transmission time is saved for later retrieval by CPU 314.

In an example embodiment, if CPU 314 desires to receive a timestamp corresponding to when the packet was transmitted by one of PHYs 302, 304, 306, CPU 314 sets a time-bit and optionally inserts a signature in a header for the packet. CPU 314 then forwards the packet to FC 310. FC 310 is configured to forward the packet to MAC 308. The time-bit may be sent to MAC 308 unchanged, or alternatively, FC 310 may set another pre-defined time-bit and/or signature to inform MAC 308 that timestamp data for the packet is desired. MAC 308 is configured to retrieve the time-bit and signature and to insert the time-bit and signature into a preamble of the packet to be transmitted. The packet is then forwarded to the PHY transmitting the packet (e.g. PHY 304). The PHY transmitting the packet is responsive to the time-bit and signature in the preamble of the packet to store the time when the packet was transmitted. The PHY removes the time-bit, and if present the signature, before transmitting the packet and stores the timestamp for the packet.

In an example embodiment, device 300 may function as a switch, and packets may be received on one PHY and transmitted for another PHY. For example, a packet may be received by PHY 302, processed by MAC 308, and forwarded by FC 310. FC 310 may determine the packet is to be transmitted via PHY 304 and thus route the packet to PHY 304 via MAC 308. Alternatively, FC 310 may forward the packet to CPU 314, which determines that the packet is to be routed to PHY 304 and thus forwards the packet to FC 310, which forwards the packet to MAC 308 and from MAC 308 to PHY 304. In accordance with an example embodiment, PHY 302 may add or insert timestamp data into the packet when it is received. Optionally, the timestamp data may include a signature/frame ID with the timestamp. When MAC 308 receives the packet, the timestamp may be employed for any suitable MAC layer process that employs a timestamp. MAC 308 forwards the packet and the timestamp data to FC 310. FC 310 may retrieve the timestamp data and/or forward the packet and timestamp data to either CPU 314 and/or MEM 312. When CPU 314 or FC 310 determine to route the packet through another PHY (e.g. PHY 304), CPU 314 and/or FC 310 may set a time-bit associated with the packet as described herein to request a time from PHY 304 corresponding to when the packet was actually transmitted. In addition to a time-bit, a signature or frame ID may also be included, which may or may not be the same as a signature/frame ID inserted into the packet when it was received. The packet is routed to MAC 308, which then forwards the packet and time-bit to PHY 304. PHY 304 then records the timestamp data and retains it for either FC 310 and/or CPU 314, as described herein.

Figure 4:
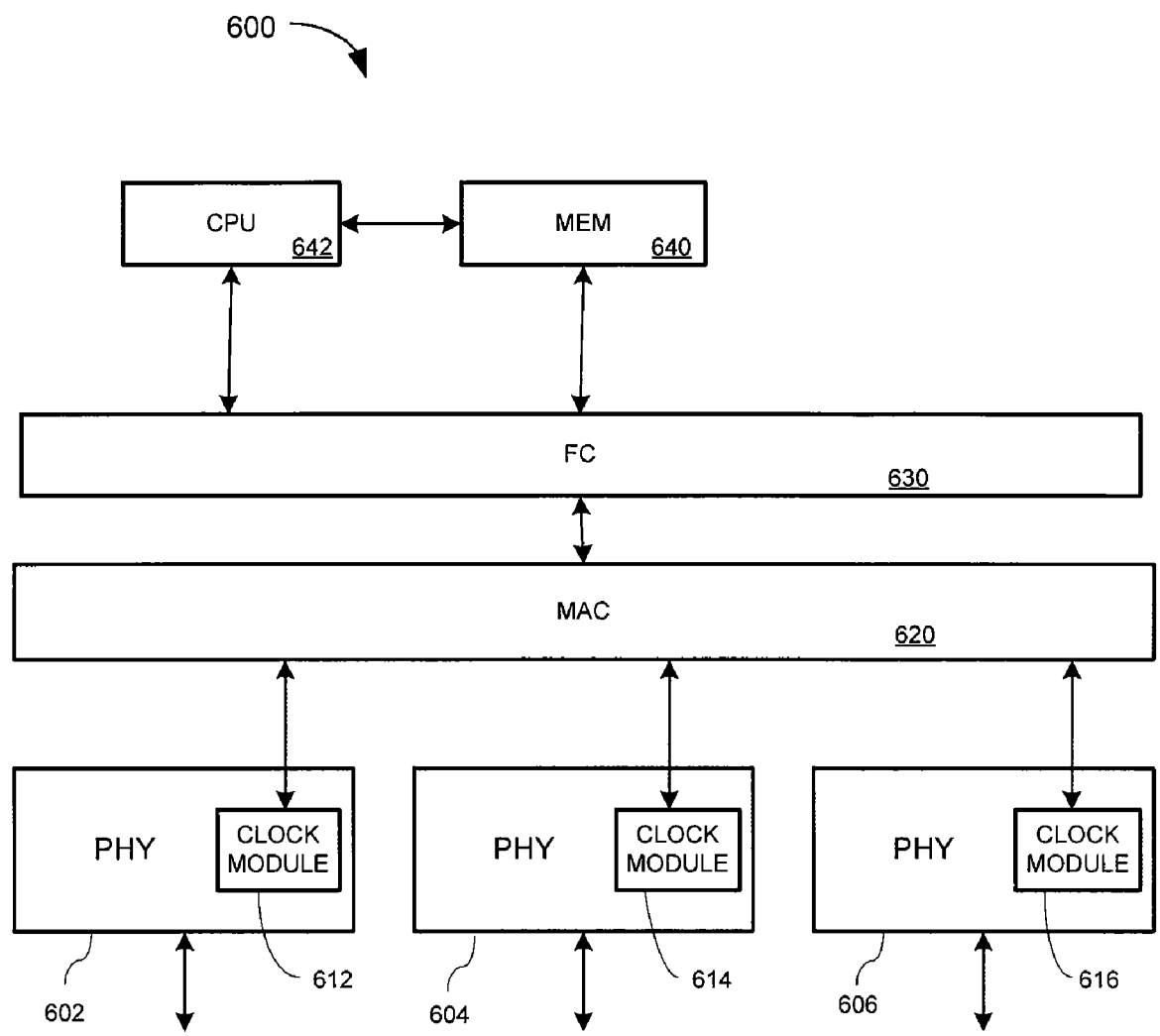
FIG. 4 illustrates an example system configured to synchronize clock modules in a plurality of physical layer processing devices.

FIG. 4 illustrates an example system 600 configured to synchronize clock modules in a plurality of physical layer processing devices. In this example, three physical layer processing devices (PHYs) 602, 604, 606 are illustrated; however, those skilled in the art should appreciate that the principles that are described herein are applicable to systems with any physically realizable number of PHYs. PHYs 602, 604, 606 have corresponding clock modules 612, 614, 616 respectively. PHYs 602, 604, 606 are coupled to MAC 620. MAC 620 is coupled to FC 630, which is coupled to MEM 640, and MEM 640 is coupled to CPU 642. FC 630 may either send and/or receive packets via MEM 640 and/or CPU 642.

In an example embodiment, clock modules 612, 614, 616 are synchronized by data packets sent from MAC 620. The packets may originate from CPU 642, MEM 640, or any other process in communication with FC 630. Clock modules 612, 614, 616 may be synchronized by every packet or during a predetermined time interval (for example once per minute). In operation, MAC 620 sends a time along with (or embedded in) outgoing packets to PHYs 602, 604, 606. A bit may be set in the preamble to enable a PHY receiving the packet to determine that the time in the preamble is the current time and not a signature to be stored with the time. Logic in either the PHYs or the clock modules compensate for the delay between the MAC 620 and the PHY receiving the packet. For example, a packet is sent from MAC 620 to PHY 602, after compensating for the delay between MAC 620 and PHY 602, clock module 612 is synchronized with the time provided by MAC 620.

In an example embodiment, clock modules 612, 614, 616 are synchronized by CPU 642. For example CPU 642 sends a signal to PHYs 602, 604, 606 requesting their current time In an example embodiment, the signal is sent via a single hard-wired connection to each PHY to minimize latency. The signal may also be sent by FC 630 instead of CPU 642. Clock modules 612, 614, 616 respond with their current time. The times may be stored in a register accessible by CPU 642 and/or another memory accessible by CPU 642 such as a stack (e.g. a FIFO stack). CPU 642 can compare the times retrieved for PHYs and adjust individual PHYs. For example, if the time of clock module 616 is different by more than a predetermined threshold, which may also account for differences between the resolution between the clocks, then clock modules 612, 614, CPU 642 can take corrective action, such as signaling clock module 616 to increment or decrement the time and/or signal a new time seed.

Figure 6:
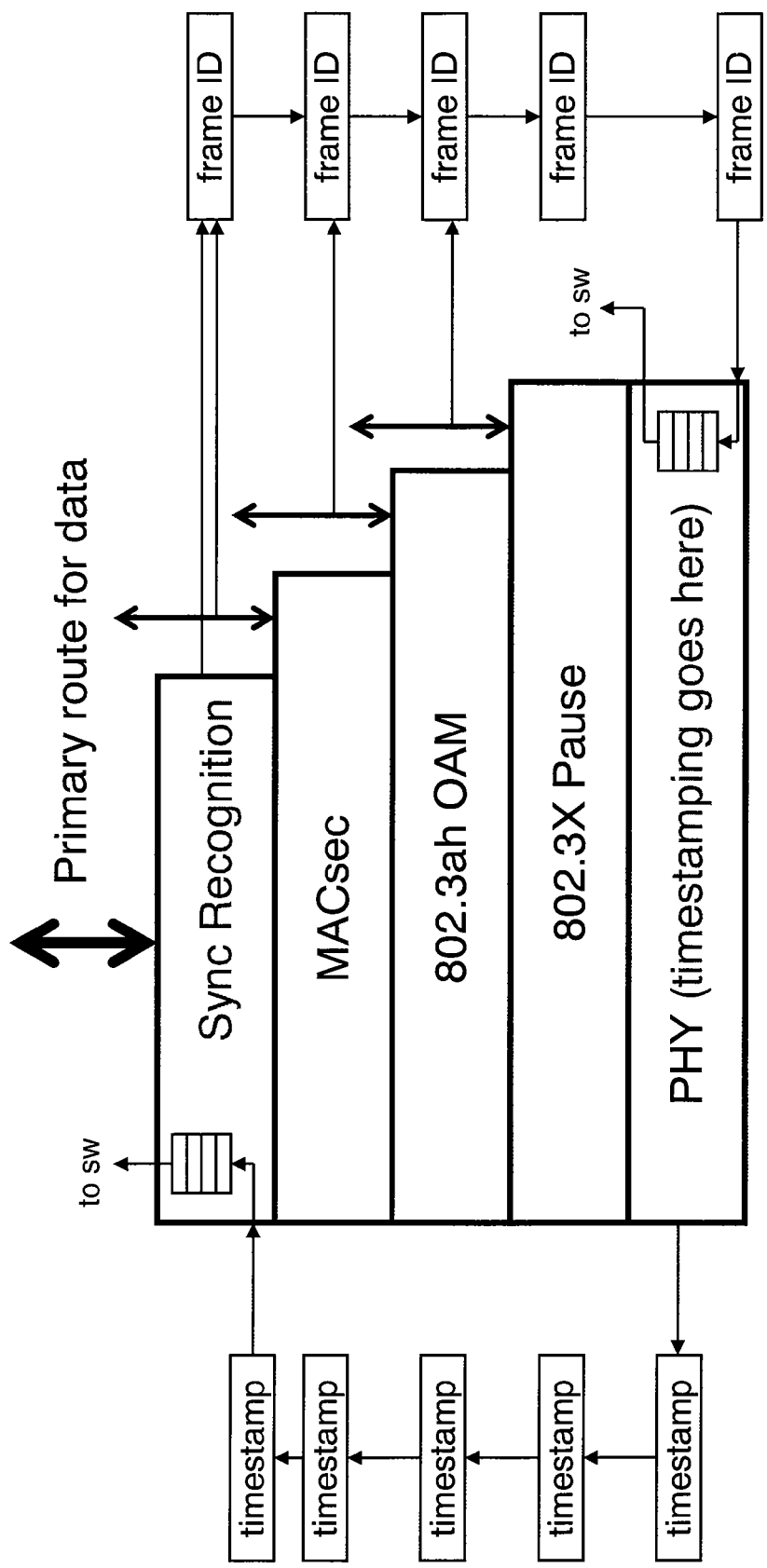
FIG. 6 illustrates an example of frame processing employing the Open Systems Interconnection stack.

FIG. 6 illustrates an example of frame processing employing the Open Systems Interconnection stack. In the example illustrated in FIG. 6, when frames are received by the PHY, the timestamp is inserted or otherwise associated with the frame (e.g. can be appended or pre-appended). The timestamp is then passed through 802.3X, 8023ah OAM, MAC security (MACsec) and Sync Recognition protocols. Note that the timestamp inserted by the PHY can be employed by any protocol because the timestamp is protocol independent. For frames that are being transmitted, a frame ID is associated with the frame and passed through the various protocols. A frame ID can also be employed with received frames. A timestamp for a transmitted frame is generated when the frame is transmitted. The frame ID enables any protocol processing the frame to match the timestamp with the appropriate frame.

Figure 7:
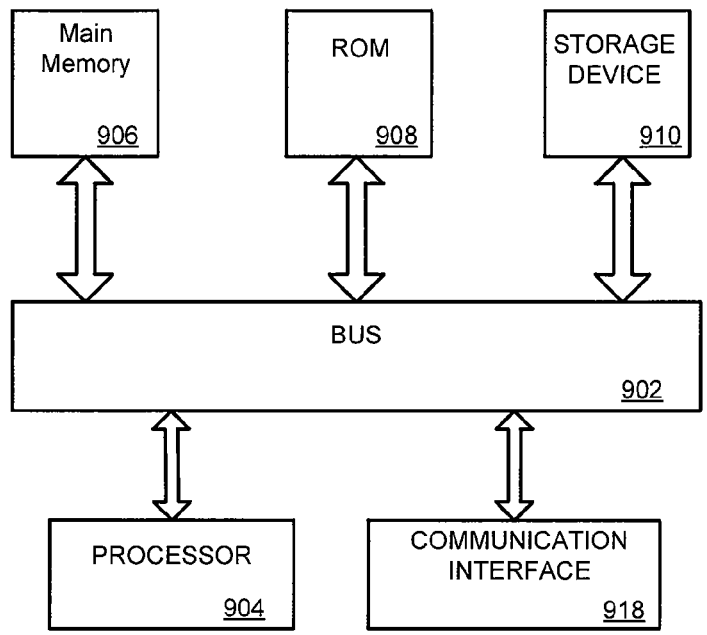
FIG. 7 illustrates an example computer system upon which an example embodiment may be implemented.

FIG. 7 is a block diagram that illustrates a computer system 900 upon which an example embodiment may be implemented. Computer system 900 is suitable for implementing the functionality of the logic for the various components herein. For example, computer system 900 may implement PHY 100, timestamp logic 106, clock module 108 in FIG. 1; PHY 100, MAC 202, and CPU 204 in FIG. 2; PHYs 302, 304, 306, MAC 308, FC 310, MEM 312, and CPU 314 in FIG. 3; as well as the modules described in FIG. 4.

Computer system 900 includes a bus 902 or other communication mechanism for communicating information and a processor 904 coupled with bus 902 for processing information. Computer system 900 also includes a main memory 906, such as random access memory (RAM) or other dynamic storage device coupled to bus 902 for storing information and instructions to be executed by processor 904. Main memory 906 also may be used for storing a temporary variable or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

An aspect of the example embodiment is related to the use of computer system 900 for flexible time stamping. According to an example embodiment, flexible time stamping is provided by computer system 900 in response to processor 904 executing one or more sequences of one or more instructions contained in main memory 906. Such instructions may be read into main memory 906 from another computer-readable medium, such as storage device 910. Execution of the sequence of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 904 for execution. Such a medium may take many forms, including but not limited to non-volatile media, volatile media, and transmission media. Non-volatile media include, for example, optical or magnetic disks, such as storage device 910. Volatile media include dynamic memory, such as main memory 906. Transmission media include coaxial cables, copper wire, and fiber optics, including the wires that comprise bus 902. Transmission media can also take the form of acoustic or light waves such as those generated during radio frequency (RF) and infrared (IR) data communications. Common forms of computer-readable media include for example floppy disk, flexible disk, hard disk, magnetic cards, paper tape, any other physical medium with patterns of holes, a RAM, a PROM, an EPROM, a FLASH-PROM, CD, DVD or any other memory chip or cartridge, or any other medium from which a computer can read.

Various forms of computer-readable media may be involved in carrying one or more sequences of one or more instructions to processor 904 for execution. For example, the instructions may initially be borne on a magnetic disk of a remote computer. The remote computer can load the instructions into its dynamic memory and send the instructions using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 may also include a communication interface 918 coupled to bus 902. Communication interface 918 provides a two-way data communication coupling computer system 900 to other devices (not shown).

For example, communication interface 918 may be a local area network (LAN) card to provide a data communication connection to a compatible LAN. As another example, communication interface 918 may be an integrated services digital network (ISDN) card or a modem to provide a data communication connection to a corresponding type of telephone line. Wireless links may also be implemented. In any such implementation, communication interface 918 sends and receives electrical, electromagnetic, or optical signals that carry digital data streams representing various types of information.

In view of the foregoing structural and functional features described above, methodologies in accordance with example embodiments will be better appreciated with reference to FIGS. 8-11. While, for purposes of simplicity of explanation, the methodologies of FIGS. 8-11 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement the methodologies described herein. The methodologies described herein are suitably adapted to be implemented in hardware, software, or a combination thereof.

Figures 8, 9:
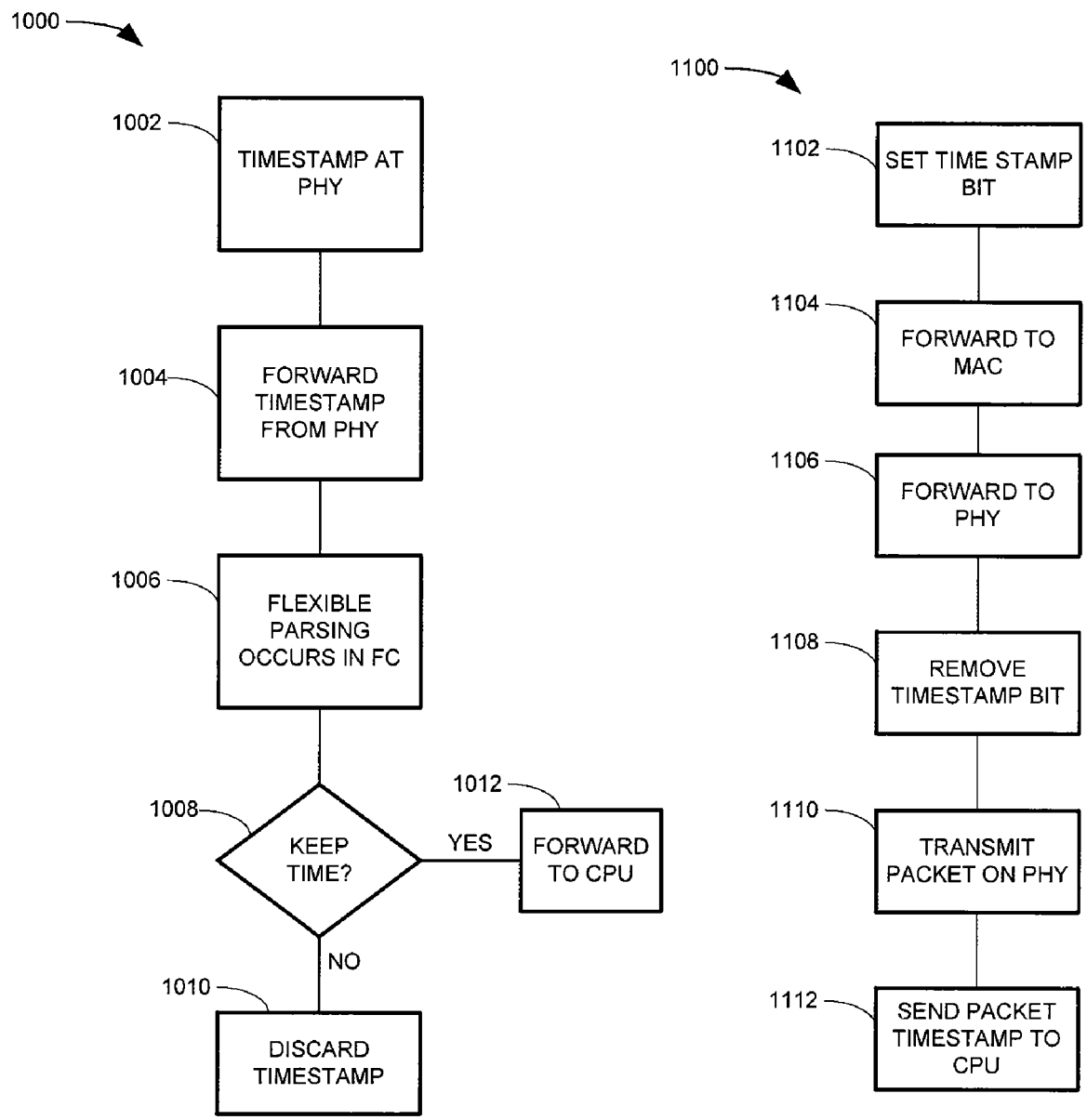
FIG. 8 illustrates an example of a method for time stamping a received packet.
FIG. 9 illustrates an example of a method for signaling a physical layer interface to insert a timestamp and providing the timestamp to a processor.

FIG. 8 illustrates an example of a method 1000 for time stamping a received packet at physical layer (PHY). At 1002, a packet is received at the physical layer interface. The received packet is timestamped at the physical processing layer interface. In an example embodiment, the packet comprises a preamble portion and a data portion, similar to packet 700 illustrated in FIG. 5. In an example embodiment, timestamp data is inserted into the header portion of the packet. In another example embodiment, timestamp data is pre-appended or appended to the data portion of the packet. In an example embodiment, timestamp data may include additional data, such as data representative of the resolution of the timestamp (for example, 10 nanoseconds (ns), 5 ns, 1 ns, 0.1 ns, etc.).

At 1004, the packet is forwarded to a MAC interface. If the MAC interface processor utilizes timing information for a MAC (or Network Layer) protocol, the MAC processor can retrieve the timestamp received from the PHY interface. The MAC interface forwards the packet to a processor. The processor may be a regular CPU (for example, in an end device such as a telephone) or may be a forwarding controller (for example, in a switch ASIC, which is the example illustrated in FIG. 8). The MAC interface may forward the packet unchanged as received from the PHY interface or can perform an appropriate conversion of the packet for the next processor. For example, the MAC interface may remove the preamble and insert timestamp data in the MAC header.

At 1006, the forwarding controller (FC) receiving the packet from the MAC can parse the packet. The forwarding controller retrieves the timestamp associated with the packet. At 1008, the forwarding controller determines whether the timestamp is needed by the CPU that will be receiving the packet. If the timestamp is needed (YES), at 1012 the timestamp is forwarded to the CPU. The timestamp may be forwarded in a preamble for the packet, or may be pre-appended or appended to the frame. If at 1008 the packet is not needed (NO), at 1010 the timestamp is discarded.

FIG. 9 illustrates an example of a method 1100 for signaling a physical layer interface device to note the time a packet is actually transmitted and providing the time to a device requesting the time. Method 1100 enables a device, such as a processor, to acquire the actual time a packet was sent on the wire (or in the air for a wireless network) as opposed to when the packet left the device. This is more accurate because delays and jitter due to processing, such as buffering and encryption at the MAC layer, etc. may reduce the accuracy of times recorded by the CPU.

At 1102, the processor requesting a time for when the packet is transmitted sets a time stamp bit (or time-bit). In particular embodiments, a signature or frame ID may also be inserted into the packet. The packet is then forwarded to the MAC interface at 1104. The time-bit is forwarded with the packet. The time-bit may be sent in a preamble or header associated with the packet or, as illustrated in FIG. 4, the time-bit can be set according to the protocol processing the packet. For example, one protocol may set the time-bit in a PSV header, while another protocol may set a time-bit in a SCH header.

At 1106, the packet is forwarded from the MAC (or network layer interface) to the physical layer (PHY) interface for transmission. The time-bit is retained while forwarding the packet from the MAC to the PHY so the PHY can determine whether the process sending the packet is requesting a timestamp.

At 1108, the PHY processor removes the time-bit. At 1110, the packet is transmitted by the PHY transmitter. If the time-bit was set, at 1112 the time corresponding to when the packet was sent is provided to the device (such as a processor or CPU) requesting the timestamp. As described herein supra, the time may be communicated to the CPU employing any means such as setting a register, loading a FIFO and/or sending a signal comprising data representative of the time to the CPU. In an example embodiment, the PHY stores the time (and, in particular embodiments, a signature is also stored along with the time) and waits for the device, such as a CPU, to retrieve it.

In addition to the time-bit, other data may also be forwarded from the CPU to the PHY. For example, as illustrated in FIG. 6, a frame ID may accompany the packet so the CPU can match the time sent with the appropriate packet. In addition, the PHY may provide additional data to the CPU, such as the resolution of the PHY's clock.

FIG. 10 illustrates an example of a method 1200 for updating a physical layer (PHY) processor clock module via a packet. Methodology 1200 enables a PHY to update its clock module frequently. For example, the PHY may update the clock every packet or during a predetermined interval (for example, every 10 packets or every two seconds).

At 1202, the MAC processor sends a packet to the PHY. The packet may be a special timing synchronization packet or may be a data packet destined for transmission by the PHY. A timestamp from the MAC accompanies the packet. The timestamp may be inserted inside a part of the packet, such as the preamble or header, which would not be encrypted or can be pre-appended or appended onto the packet.

At 1204, the PHY compensates for the delay from the MAC to PHY. This enables devices such as switches with multiple PHYs to be synchronized with the MAC's clock.

At 1206, the PHY updates its clock. If the resolution of the PHY is less than the resolution of the MAC, the PHY may round up or down. If the packet sent from the MAC is a packet that is to be transmitted by the PHY, the PHY also transmits the packet. The packet may be transmitted concurrent to the clock/timer being updated.

In an example embodiment, an averaging algorithm may be employed to obtain an average over many current time samples for updating the current time in the PHY. This can filter out any dynamic latency from the MAC to PHY.

FIG. 11 illustrates an example of a method 1300 for synchronizing multiple physical layer processor clock modules. At 1302, a signal is sent to all (or a plurality of) PHYs requesting their current time. This signal is sent simultaneously with minimal skew between the signal arrival and subsequent time capture at each PHY.

At 1304, the CPU or device requesting the time from the PHYs receives the current time from the PHYs. Any suitable method for conveying the time can be employed. For example, the PHYs can load a register that is accessible by the CPU. As another example, the PHYs may place the data in a FIFO accessible by the CPU. The FIFO data may also include an identifier for the PHY.

At 1306, the CPU compares and, if desired, adjusts PHY clocks. For example, if the CPU determines from the retrieved times that one PHY's time is different from the other PHY's time by more than a predetermined amount (e.g. 5 ns), the CPU can signal the PHY to increment or decrement its clock accordingly. In an example embodiment, the CPU may send the current time (or a time seed) to the PHY to update its clock. In an example embodiment, the CPU compares the time returned from the PHYS and compares it to its own time clock and updates any PHY whose time clock is off by more than a predetermined amount of time. In particular embodiments, the CPU compensates for delays between the PHY and CPU.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims interpreted in accordance with the breadth to which they are fairly, legally, and equitably entitled.

The invention claimed is:

1. A method, comprising:
   setting a time-bit in a packet to be sent by a processor;
   forwarding the packet with the time-bit set to a media access control processing device;
   forwarding the packet with the time-bit set from the media access control processing device to a physical layer processing device;
   removing the time-bit from the packet by the physical layer processing device;
   transmitting the packet after removing the time-bit by the physical layer processing device; and
   storing a timestamp corresponding to a time the packet was transmitted by the physical layer processing device responsive to the time-bit being set.

2. The method of claim 1, further comprising:
   associating a frame identifier with the packet by a device requesting the timestamp;
   forwarding the associated frame identifier with the packet to the media access control processing device;
   forwarding the associated frame identifier with the packet from the media access control processing device to the physical layer processing device; and
   storing the frame identifier with the timestamp.

3. An apparatus, comprising:
   a physical layer processing device;
   a media access control processing device coupled to the physical layer processing device; and
   a processor in data communication with the media access control processing device;
   wherein the processor is configured to set a time-bit in a packet to be transmitted;
   wherein the processor is configured to forward the packet with the time-bit set to the media access control processing device;
   wherein the media access control processing device is responsive to receiving the packet with the time-bit set to forward the packet with the time-bit set to the physical layer processing device; and
   wherein the physical layer processing device is responsive to receiving the packet with the time-bit set to remove the time-bit from the packet, transmit the packet after removing the time-bit, and store a timestamp corresponding to a time the packet was transmitted by the physical layer processing device.

4. The apparatus of claim 3, wherein the processor is configured to insert a time-bit and a signature in a header of the packet to be transmitted.

5. The apparatus of claim 3, wherein the physical layer processing device stores the timestamp for the packet in a register for retrieval by the processor.

6. The apparatus of claim 3, wherein the physical layer processing device stores a timestamp for the packet to be transmitted in a first-in-first-out buffer for retrieval by the processor.

7. The apparatus of claim 3, wherein the processor is configured to associate a frame identifier with the packet;
   wherein the frame identifier is forwarded with the packet to the media access control processing device;
   wherein the media access control processing device forwards the frame identifier with the packet to the physical layer processing device; and
   wherein the frame identifier is stored with the timestamp.

8. The apparatus of claim 3, wherein the physical layer processing device is configured to determine a preamble portion and a data portion of a received packet that was received from a physical media;
   wherein the physical layer processing device logic is further configured to insert a timestamp into the preamble portion of the packet; and
   wherein the physical layer processing device logic is further configured to forward the packet with the timestamp inserted into the preamble to the media access control processing device.

9. The apparatus of claim 8, wherein the media access control processing device is configured to forward the received packet and the timestamp to the processor.

10. The apparatus of claim 9, wherein the media access control processing device is configured to forward the received packet and the timestamp to the processor by obtaining the timestamp from the preamble of the received packet and inserting the timestamp into a media access control layer preamble of the received packet.

11. The apparatus of claim 9, wherein the processor comprises logic for parsing the packet and determining whether to retain the timestamp for the packet.

12. The apparatus of claim 9, the physical layer processing device further comprising a clock module;
   wherein the media access control processing device further comprises logic configured for sending an updated time to the physical layer processing device;
   wherein the physical layer processing device logic is responsive to receiving the updated time from the media access control processing device to adjust the updated time by compensating for a delay between the physical layer processing device and the media access control processing device; and wherein the physical layer processing device is further configured to update the clock module with the compensated, updated time received from the media access control processing device.

13. The apparatus of claim 9, further comprising a second physical layer processing device;

wherein the first physical layer processing device comprises a first clock module and a first physical layer processing device data storage device coupled to the processor, and the second physical layer processing device comprises a second clock module and a second data storage device coupled to the processor;

wherein the processor is configured to signal the first physical layer processing device and the second physical layer processing device to provide a current time;

wherein the first physical layer processing device is responsive to the signal to store a current time from the first clock module in the first data storage device;

wherein the second physical layer processing device is responsive to the signal to store a current time from the second clock module in the second data storage device;

wherein the processor is configured to acquire the time for the first physical layer processing device and the second physical layer processing device from the first data storage device and second data storage device respectively;

wherein the processor is further configured to send a time adjustment signal to the first physical layer processing device; and wherein the first physical layer processing device adjusts the first clock module responsive to receiving the time adjustment signal.

14. The apparatus of claim 13, wherein the processor is further configured to send a second time adjustment signal to the second physical layer processing device; and wherein the second physical layer processing device adjusts the second clock module responsive to receiving the second time adjustment signal.

15. The apparatus of claim 3, wherein the preamble further comprises data indicating a resolution for the timestamp.

* * * * *